T. M. HOSKINS.
WHEEL.
APPLICATION FILED DEC. 13, 1918.
1,365,404.
Patented Jan. 11, 1921.
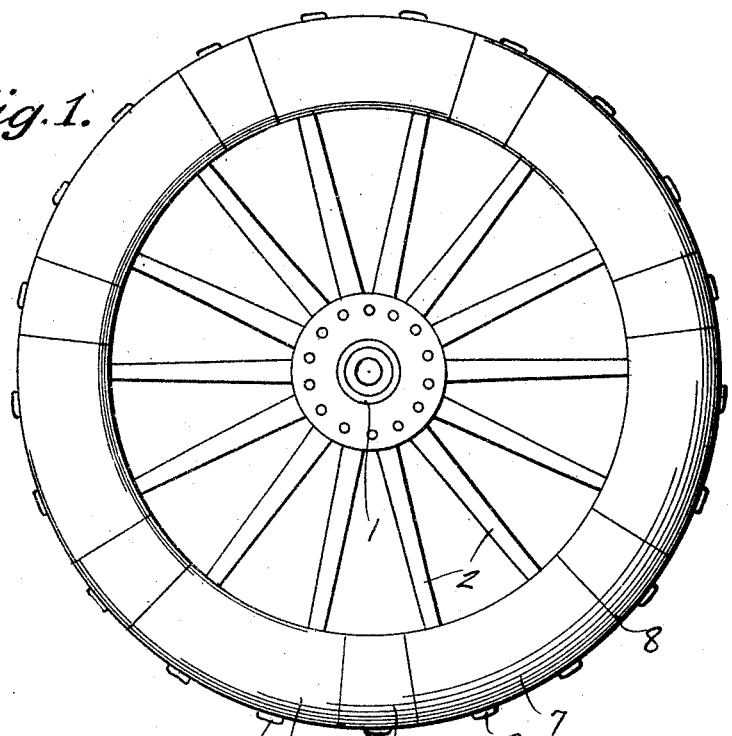
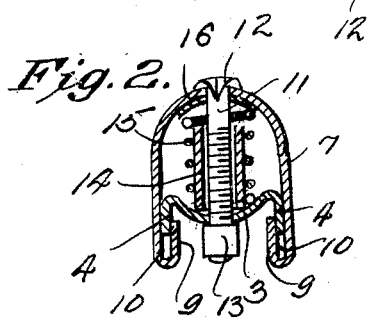
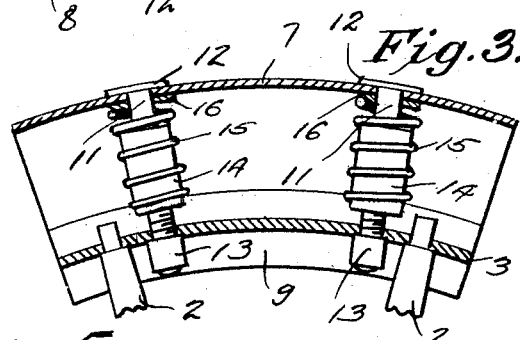
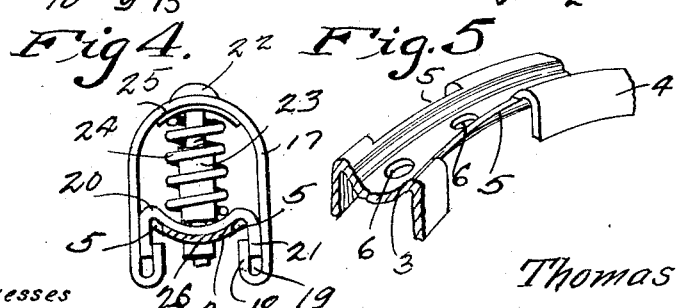
Witnesses
James F. Crown,
J. P. Campbell
Inventor
Thomas M. Hoskins,
By Richard B. Owen,
Attorney

UNITED STATES PATENT OFFICE.

THOMAS MARSHALL HOSKINS, OF EVANSVILLE, INDIANA.

WHEEL.

1,365,404.  Specification of Letters Patent.  Patented Jan. 11, 1921.

Application filed December 13, 1918. Serial No. 266,600.

*To all whom it may concern:*

Be it known that I, THOMAS M. HOSKINS, a citizen of the United States, residing at Evansville, in the county of Vanderburg and State of Indiana, have invented certain new and useful Improvements in Wheels, of which the following is a specification.

My invention relates to new and useful improvements in wheels and more particularly to a resilient tire for wheels.

The principal object of the invention is the provision of a wheel having a resilient tire which is non-puncturable but which will have sufficient resiliency to take up jars when going over ground.

Another object of the invention is the construction of a tire in sections whereby they may be easily assembled and yield when going over the ground.

A further object is the construction of a felly in such a manner whereby the sections of the tire may be interlocked therewith.

With these and other objects in view my invention consists in the novel details of construction and arrangement of parts which will be more clearly understood from the following specification and drawings, in which:

Figure 1 is a side elevation.

Fig. 2 is a transverse vertical section through the tire.

Fig. 3 is a longitudinal vertical section through the tire.

Fig. 4 is an end view of one of the sections of the tire, and,

Fig. 5 is a detailed perspective of a section of the wheel felly.

In the drawings the numeral 1 indicates the hub of a wheel and 2 the spokes of usual construction. A felly 3 is carried on the outer ends of the spokes and as is more particularly illustrated in Figs. 2 and 4 of the drawings the felly is concavo-convex in cross section. The side edges of the felly are bent to form the circumferentially inwardly extending flanges 4 and as is more particularly illustrated in Fig. 5 of the drawings a section of each side flange 4 is cut away for a purpose which will be presently described. The cut away portions of the flanges are indicated at 5. A plurality of circumferentially spaced openings 6 are formed in the concavo-convex portion of the felly as is more particularly illustrated in Fig. 5 of the drawing and the purpose of these openings will be later described.

The tire is composed of a plurality of sections indicated at 7 and 8 and as is more particularly illustrated in Fig. 1 of the drawing the sections 7 are of greater length than the sections 8 and in assembling the sections will alternate. While this is the preferable construction of the sections it will be understood that, if desired, the sections may be of equal length. Each section is of inverted U-shape in cross section, as more particularly illustrated in Fig. 2 of the drawings and the inner edges are bent back upon themselves as indicated at 9 so as to extend into the sections and leave a space 10 between the side walls of the sections and the bent portion 9. As illustrated the flanges 4 on the felly are adapted to be received in the spaces 10 when the tire sections are in position upon the felly.

Threaded bolts 11 extend through openings in the sections of the tire and are then adapted to pass through the openings 6 in the felly for connecting the sections of the tire against circumferential movement with respect to the felly. The heads of the bolts are indicated at 12 and preferably will be roughened for the purpose which will be presently described. A nut 13 is adapted to be received on the threaded end of the bolt and normally engage the underside of the felly as more particularly illustrated in Figs. 2 and 3 of the drawings. The openings 6 in the felly 3 are of sufficient diameter to allow the bolts 11 to pass freely therethrough when the sections of the tire are depressed.

A sleeve 14 surrounds each of the bolts 11 and will be of such interior diameter to allow the bolts to freely pass therethrough. As illustrated more particularly in Figs. 2 and 3 of the drawing the sleeves are of less height than the distance between the tire and felly whereby the sections of the tire may be depressed with respect to the felly. A coil spring 15 encircles each of the sleeves and the one end of the spring bears against the felly whereas the other end bears against a leather washer 16 which surrounds the bolt and engages the interior of the tire section. The inner convolution of each of the springs is preferably of such a size as to frictionally engage the sleeve to prevent same from sliding on the bolt. Of course, if desired, this leather washer might be omitted and allow the spring to engage the interior of the tire section itself. However the washer will prevent the end of the spring from unduly wearing the tire section.

In the preferable construction of the tire two bolts with the coöperative parts will be used with the longer section whereas only one bolt with its coöperating parts will be used with each of the shorter sections 8. In assembling the sections 7 and 8 they are first placed over that section of the felly having the cut-out portions 5 and the sections are slid until the bent portions 9 engage the flanges 4 and allow said flanges 4 to be received in the spaces 10. After the sections of the tire have been slid into the proper position the bolts will be passed through the openings 6 and, as above stated, thereby hold the sections of the tire against circumferential creeping.

The last section of the tire to be placed into position will necessarily have to be of slightly different construction than those previously described as no flange 4 is provided on the felly at the cut-out portion indicated at 5. The construction of the last section to be applied is illustrated in Fig. 4 of the drawings. This section comprises the inverted U-shaped portion indicated at 17 and is provided with the parallel bent portions 18 forming spaces 19 similar to the spaces 10 formed in the other sections. A plate 20 is provided with inwardly extending flanges 21 adapted to be received in the spaces 19. The plate 20 is concavo-convex in cross section and is adapted to rest upon the top of the felly 3 as illustrated in Fig. 4 of the drawings. A bolt 22 passes through an opening formed in the section 17 and is adapted to pass through the opening 6 formed adjacent the cut-out portions 5 of the felly. A sleeve 23 surrounds the bolt and a coil spring 24 surrounds the sleeve and engages the outer face of the plate 20 and the leather washer 25 on the bolt engaging the undersurface of the section 17. In applying this last section of the tire the plate 20 will be placed in position in the section 17 so that the inwardly extending portions 21 will be received in the spaces 19. The section is then placed in position with the plate 20 resting upon the top of the felly and the bolt 22 will then be placed through the opening 6 and a nut 26 threaded upon the bolt.

From the above detailed description of the several parts it is thought that the manner of assembling the tire will be understood. When the sections have been assembled as described they will normally be held in the position as indicated in Fig. 1 of the drawings. As the wheel rotates the sections may be depressed against the tension of the coil springs. The sleeves surrounding the bolts will prevent the coil springs from buckling and will hold them in proper position at all times.

It will be noted that I have formed a resilient tire which is simple in construction and in which the sections may be easily assembled or disengaged from the felly. Should one section become worn it may be removed and another one placed in position. By providing the roughened heads 12 on the bolts 11 the heads will act to grip the ground to prevent skidding. The openings 6 in the felly 3 being of greater diameter than the bolts will allow the bolts to pass freely therethrough and the flanges 4 on the felly will act as a guide for the tire sections.

The foregoing description and the drawings have reference to what may be considered the preferred, or approved, form of my invention. It is to be understood that I may make such changes in construction and arrangement and combination of parts, materials, dimensions, etc., as may prove expedient and fall within the scope of the appended claim.

Having fully described my invention what I claim as new and desire to secure by Letters Patent is:—

A wheel comprising a hub, spokes connected to the hub, a felly connected to the spokes, an inwardly extending flange formed on each edge of the felly, a portion of each of said flanges being cut away, a tire comprising a plurality of inverted U-shaped sections slidable around the felly, each of said sections provided with flanges extending parallel to and spaced from its sides adapted to be received in the cutout portions of the felly flanges and to engage the felly flanges when slid with respect to the felly, and a section adapted to be received over the cutout portions of the felly, said section comprising an inverted U-shaped portion having flanges and a plate adapted to be received on the wheel felly and provided with flanges adapted to engage the flanges of the inverted U-shaped portion and resilient means provided within the tire.

In testimony whereof I affix my signature in presence of two witnesses.

THOMAS MARSHALL HOSKINS.

Witnesses:
 JOHN KELLEN,
 BEN. F. CORGOOD.